United States Patent [19]
Bush

[11] Patent Number: 5,541,591
[45] Date of Patent: Jul. 30, 1996

[54] METHOD AND APPARATUS FOR MEASURING AND CALIBRATION OF TURBULENCE

[76] Inventor: Gary L. Bush, 2733 Steamboat Cir., Arlington, Tex. 76006

[21] Appl. No.: 426,768

[22] Filed: Apr. 21, 1995

[51] Int. Cl.⁶ .................................................. G08B 21/00
[52] U.S. Cl. ........................ 340/968; 340/601; 340/963
[58] Field of Search ................................... 340/968, 963, 340/601

[56] References Cited

U.S. PATENT DOCUMENTS

| | | | |
|---|---|---|---|
| 4,212,444 | 7/1980 | Stephan | 244/182 |
| 4,857,922 | 8/1989 | Miller et al. | 340/968 |
| 4,891,642 | 1/1990 | Muller | 340/968 |
| 4,905,000 | 2/1990 | Bateman | 340/968 |
| 4,937,571 | 6/1990 | Bonafe | 340/968 |
| 4,947,165 | 8/1990 | Zweifel | 340/968 |
| 4,965,572 | 10/1990 | Adamson | 340/968 |
| 4,965,573 | 10/1990 | Gallagher et al. | 340/968 |
| 5,059,964 | 10/1991 | Bateman | 340/968 |
| 5,105,191 | 4/1992 | Keedy | 340/968 |
| 5,119,091 | 6/1992 | Zweifel | 340/968 |
| 5,187,478 | 2/1993 | Grove | 340/963 |
| 5,262,782 | 11/1993 | Rubin et al. | 342/26 |
| 5,281,815 | 1/1994 | Even-Tov | 250/339.04 |
| 5,341,677 | 8/1994 | Maris | 73/147 |
| 5,359,330 | 10/1994 | Rubin et al. | 342/26 |

OTHER PUBLICATIONS

L. B. Cornman, C. S. Morse, G. Cunning; "Real-Time Estimation of Atmospheric Turbulence Severity from In-Situ Aircraft Measurements"; Journal of Aircraft vol. 32 No. 1, Jan.-Feb. 1995, pp. 171-177.

*Primary Examiner*—Glen Swann
*Attorney, Agent, or Firm*—Felsman, Bradley, Gunter & Dillon, LLP

[57] ABSTRACT

A sensor that transmits data in response to detecting turbulence. The sensor is located somewhere within an aircraft. A modification circuit is connected to the sensor. This modification circuit may include a threshold detector for passing on signals exceeding a selected threshold. Other functions provided by the modification circuit could include averaging of signals and determining whether a threshold has been exceeded more than once within a particular amount of time or how many times the threshold has been exceeded within a selected amount of time. An adjustment circuit adjusts the signal based on the characteristics of the aircraft. This adjustment circuit is employed to standardize the indication of turbulence in aircraft having different characteristics. For example, a large aircraft and a small aircraft would require different adjustments of the signal to produce a standard indication of turbulence. A display device is connected to the adjustment circuit to display the standardized indication of aircraft turbulence.

14 Claims, 6 Drawing Sheets

METHOD AND APPARATUS FOR MEASURING AND CALIBRATION OF TURBULENCE

BACKGROUND OF THE INVENTION

1. Technical Field

The present invention relates to instrumentation for aircraft and more particularly to a method and apparatus for measuring and calibrating turbulence.

2. Description of the Related Art

Air turbulence, most often a nuisance, can at times pose a potentially serious danger to passengers and air crew alike traveling in aircraft. Safety improvements in the past were designed to protect passengers from some of the hazards of in flight turbulence. For example, these safety improvements included the addition of doors on overhead storage bins and the placement of signs on aircraft seat backs warning passengers of the necessity of keeping seat belts fastened at all times, not simply during take off and landing, while seated.

A goal of commercial airline operators is to provide their passengers with as much comfort as possible. This goal includes, when allowable, freedom of movement through the confined space of the aircraft cabin for the use of laboratories, to retrieve items from carry luggage for on board use, etc. It is also desirable to allow the flight attendant crew to move throughout the cabin during certain phases of the flight in order to accomplish various safety related duties as well as passenger comfort activities. Pilots of an aircraft can restrict movement in the cabin of an aircraft of either passengers or both flight attendants and passengers when the pilots deem this movement could involve a risk of injury. This restriction is most often accomplished by the use of lighted signs indicating that seat belts should be fastened and public address announcements. Times during which movement is typically restricted include take-off, landing and at varying thresholds of turbulence intensity.

To avoid turbulence or to predict intensity levels of turbulence that may be encountered, pilots will rely on many sources of information to avoid turbulence or to predict intensity levels of turbulence. These sources of information include, for example, weather forecasts that may depict wide geographical areas of potential turbulence. Knowledge and experience also assist the pilot in recognition of some of the many conditions where a greater risk of turbulence exist. By far the most numerous and reliable inputs that a pilot will employ in determining the most recent location and intensity of in-flight turbulence are reports of turbulence from other aircraft in the vicinity or on similar flight plan routings.

Pilots provide descriptions of turbulent flight conditions in both frequency and intensity. In an attempt to standardize turbulent forecasts, the FAA has chosen a "typical" aircraft type when forecasting the effect of turbulence. The "typical" aircraft used in estimating is a Saab 340 commuter twin. "Light turbulence" causes slight, erratic changes in altitude, and slight strain against seat belts; unsecured objects are displaced slightly and food services in such a situation. In light turbulence, walking is a possibility without difficultly.

"Moderate turbulence" is a turbulence of greater intensity than light turbulence, but the pilot of the aircraft is still in control at all times. Some strain occurs against seat belts and unsecured objects are displaced in moderate turbulence. Food service and walking are difficult in this type of turbulence.

"Serve turbulence" causes large, abrupt altitude excursions. The aircraft is momentality out of control, and large variations in indicated air speed occur during severe turbulence. Occupants are forced violently against seat belts and unsecure objects are thrown about the cabin. Food service and walking are impossible during severe turbulence.

"Extreme turbulence" causes the aircraft to be tossed about violently, and it is virtually impossible to control and may cause structural damage to the aircraft.

The reports of frequency of turbulence includes "occasional turbulence" which occurs less than one third of the time. "intermittent turbulence" occurs one third to two thirds of the time while continuous turbulence is evidence more than two thirds of the time. "Chop" is defined as rhythmic repetitive turbulence of any intensity and/or frequency.

Pilots will provide descriptions of turbulent flight conditions in both frequency and intensity. An example of such a report would be continuous light or occasional moderate turbulence. These reports, however, are subjective in nature, depending on a pilot's observations. Several factors may influence a pilot's interpretation of turbulent flight conditions and therefore cause variables that hinder the description of exact actual conditions. First and foremost are the ambiguities and inherent difficulties in clearly defining intensity levels. For example, slight strain against the seat belt verses strain against that seat belt (light turbulence verses moderate turbulence) poses a wide area of subjective interpretation by different pilots. Second, the experience level of the pilot making the report also is a subjective factor that can influence the pilot's interpretation of intensity and therefore, cause another variable to accurate reporting. A relatively inexperienced pilot, as expected, would often exaggerate intensity of turbulence. An experienced pilot tends to be more accurate in reports although he or she will sometimes understate the severity of turbulence intensity.

Still another variable to reports of turbulence is the type of aircraft from which the report is made. In general, larger and heavier aircraft with higher wing loading will transgress areas of turbulence with less difficulty and less oscillation than smaller and lighter aircraft. This variance often will affect the pilot's interpretation of intensity. For example, what might be interpreted as severe turbulence to a light, single engine aircraft would most probably be perceived as light to a Boeing 747. Therefore, it would be advantageous to have a method and apparatus that provides an accurate indication of turbulence encountered by an aircraft that lessens or illuminates the impact of various inputs that hinder precise reporting of turbulence.

SUMMARY OF THE INVENTION

It is therefore one object of the present invention to provide an improved method and apparatus for measurement and calibration of turbulence.

It is another object of the present invention to lesson or illuminate the impact of numerous variables that hinder precise reporting of turbulence.

It is yet another object of the present invention to provide a more uniform indication of turbulence to more accurately describe actual flight conditions.

The present invention provides a method and apparatus for measuring and calibrating turbulence in aircraft. The invention includes a sensor that transmits data in response to detecting turbulence during flight. The sensor is located somewhere within the aircraft. A modification circuit is connected to the sensor. This modification circuit may include a threshold detector for passing on signals exceeding a selected threshold. Other functions provided by the modification circuit may include, for example, averaging of signals determining whether a selected threshold has been exceeded more than once within a particular amount of time or how many times the threshold has been exceeded within a selected amount of time. Furthermore, the present invention includes an adjustment circuit that adjusts the signal based on the characteristics of the aircraft in which the apparatus is located. This adjustment circuit is employed to standardize or calibrate the indication of turbulence in aircraft having different characteristics. For example, a large aircraft and a small aircraft would require different adjustments of the signal to produce a standard indication of turbulence such that an apparatus according to the present invention in the large aircraft and in the small aircraft both provide the same turbulence indicator when transgressing the same air turbulence. A display device is connected to the adjustment circuit to display the standardized indication of aircraft turbulence.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
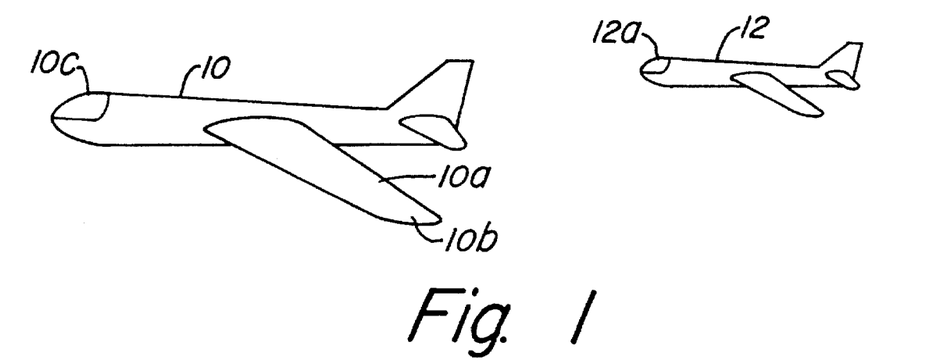
FIG. 1 is an illustration of two aircraft in which a preferred embodiment of the present invention may be implemented.

With reference now to the figures, and in particular with reference to FIG. 1, an illustration of two aircraft in which a preferred embodiment of the present invention may be implemented are depicted. In the depicted example, aircraft 10 contains a sensor 10a in wing 10b to detect turbulence during flight. The sensor relays data back to instrumentation located in cockpit 10c. In aircraft 12, both the sensor and apparatus for processing and displaying signals from the sensor are located in cockpit 12a. As can be seen in FIG. 1, aircraft 10 is larger than aircraft 12. In accordance with a preferred embodiment of the present invention, turbulence detected by both aircraft 10 and aircraft 12 will be displayed to the pilots as the same level of turbulence. In particular, the present invention employs a numeric scale in which different types of turbulence are assigned a different number. The apparatus of the present invention in aircraft 10 will calibrate the data to display the same turbulence intensity number as the apparatus of the present invention in aircraft 12 when encountering the same turbulence conditions.

Figure 2A:
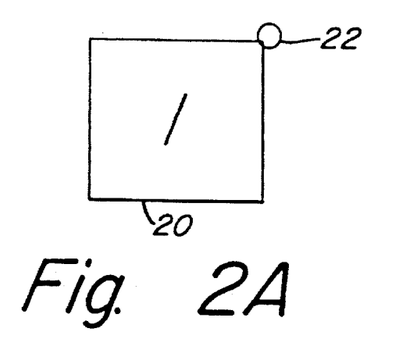
FIGS. 2A–2C are pictorial illustrations of various displays illustrated in accordance with a preferred embodiment of the present invention.

Turning now to FIGS. 2A–2C, pictorial illustrations of various displays are illustrated in accordance with a preferred embodiment of the present invention. In FIG. 2A, display 20 displays a single numeric number ranging from one to five. In accordance with a preferred embodiment of the present invention, a "1" and a "2" would describe varying intensities of what is currently classified as "light turbulence" and would establish another threshold for that category. A "3" or "4" would likewise describe "moderate turbulence". A "5" would describe the low end of "severe turbulence". Higher levels of turbulence other than "5" are extremely rare. In addition, display 20 also includes an indicator 22 that would be lit in response to the occurrence of turbulence exceeding a "5". Of course, other scales numeric or alpha or alphanumeric could be implemented in accordance with a preferred embodiment of the present invention.

Figure 2B:
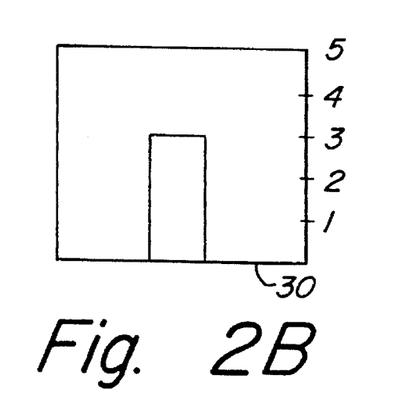
Figure 2C:
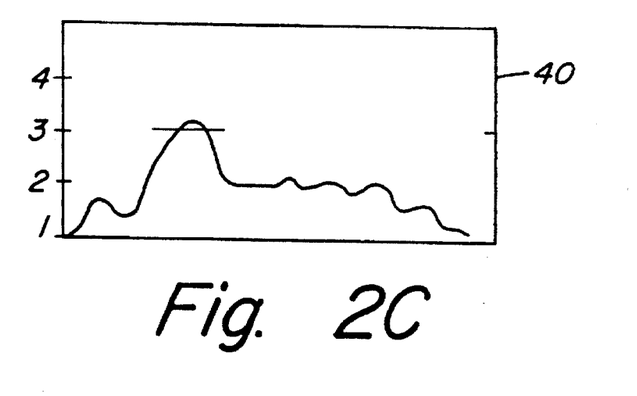

In FIG. 2B, display 30 is a bar graph type of display that shows level one through five, and FIG. 2C shows a display 40 in the form of a graph that plots data points representing turbulence encountered by the aircraft. Of course other types of numeric or graphical indicators may be employed in accordance with a preferred embodiment of the present invention. In addition, audible indications of turbulence may be used in place of or in conjunction with visual indicators.

Figure 3A:
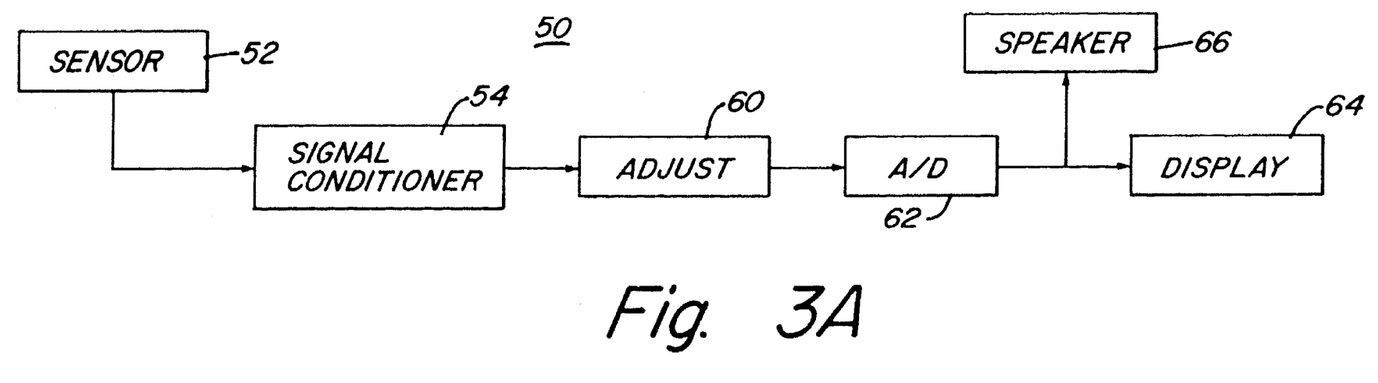
FIG. 3A is a turbulence indicator apparatus depicted in accordance with a preferred embodiment of the present invention.
Figure 3B:
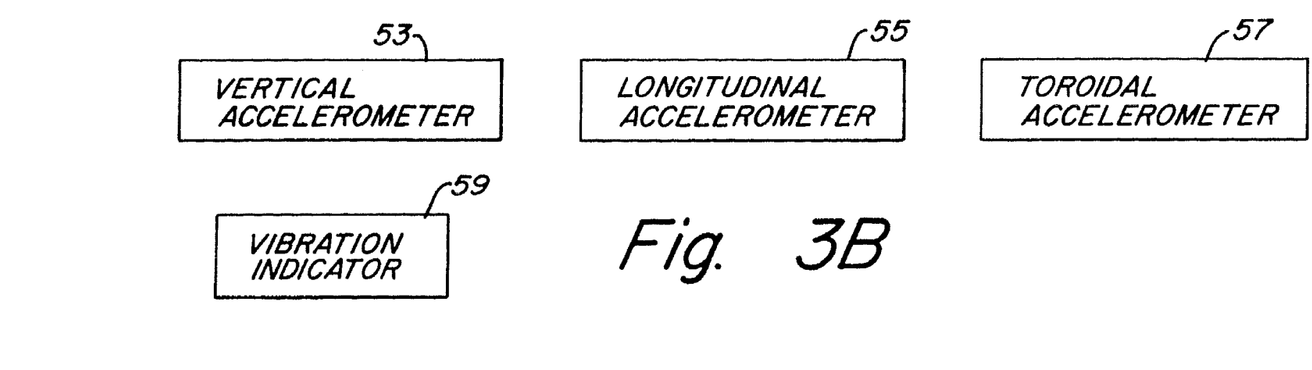
FIG. 3B is an illustration of sensors in a turbulence indicator apparatus in accordance with a preferred embodiment of the present invention.

Turning now to FIG. 3A, a turbulence indicator apparatus 50 is depicted in accordance with a preferred embodiment of the present invention. Turbulence indicator apparatus 50 includes a sensor 52 that is employed to detect turbulence. In particular, sensor 52 may be, as depicted in FIG. 3B, for example, a vertical accelerometer 53, a longitudinal accelerometer 55, a toroidal accelerometer 57, a vibration indicator 59, or any inertial platform around which turbulence oscillation can be measured. Sensor 52 may be any combination of the above described sensors or equivalents thereof. In accordance with a preferred embodiment of the present invention, a vertical accelerometer is employed to detect turbulence. The present invention may employ currently used sensors in aircraft located in various areas such as in flight recorder inputs or may be in the form of a single unit containing the sensor and the other components of turbulence indicator apparatus 50.

When sensor 52 detects turbulence, a signal is generated and sent to signal conditioner circuitry 54. Signal conditioner circuitry 54 provides any desired modification of the raw input signal received from sensor 52. Such modifications may include filtering, establishing a number of inputs above the selected threshold before sending a data signal on to the rest of turbulence indicator apparatus 50 or averaging turbulence data over a given time interval. Any one of these functions may be employed alone or in combination with others in accordance with a preferred embodiment of the present invention.

Figure 4:
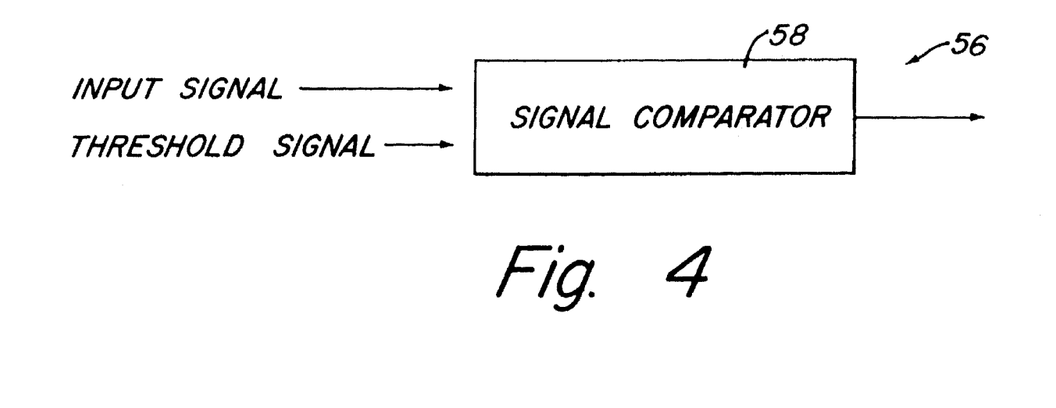
FIG. 4 illustrates an example of a component used for establishing thresholds that may be employed within the signal conditioner in FIG. 4 in accordance with a preferred embodiment of the present invention.

FIG. 4 illustrates an example of a component used for establishing thresholds that may be employed within signal conditioner circuitry 54. In particular, threshold circuit 56 includes a signal comparator 58 that receives an input signal from sensor 52 and a threshold signal that is established as a threshold that must be exceeded before signal comparator 58 will send a signal on to some other component of the present invention. Other functions such as filtering and averaging may be implemented using well known circuits in accordance with a preferred embodiment of the present invention.

Turning back to FIG. 3A, the conditioned signal is then transmitted from signal conditioner circuitry 54 to adjustment circuit 60. Adjustment circuit 60 is employed to alter the detected signal to provide for a standardized indication of turbulence between aircraft of different types and sizes. This adjustment block also may be employed to take into account different locations of sensors within aircraft of the same type and size. Typically, the adjustment will be a straight line or fixed value adjustment that is used as a multiplier to be multiplied with the detected signal. This particular block insures that a turbulence of level 3 detected by a large aircraft such as a Boeing 747 also is displayed as a level 3 turbulence in a smaller aircraft such as a cessna. The actual values used in adjustment circuit 60 may be obtained by actual testing of various aircraft in the same turbulence or by wing loading based approximation.

Wing loading of an aircraft is determined by the weight of the aircraft divided by the surface area of the wings. For example, if one aircraft has a wing loading of 100 lb/ft$^2$ and another aircraft has a wing loading of 10 lb/ft$^2$, the first would require a multiple of 10 to adjust for wing loading to calibrate a measurement of turbulence. The adjusted signal is then sent to analog to digital ("A/D") converter 62, which converts the signal into a digital signal for display in display 64. Display 64 may be one of various displays such as those depicted in FIGS. 2A–2C. Speaker 66 may be employed in place of or in conjunction with display 64. Speaker 66 is employed to provide an audibly indication of aircraft turbulence. The indication may be a single tone to indicate the presence of turbulence or various tones may be employed to indicate different levels of turbulence in accordance with a preferred embodiment of the present invention.

Figure 5:
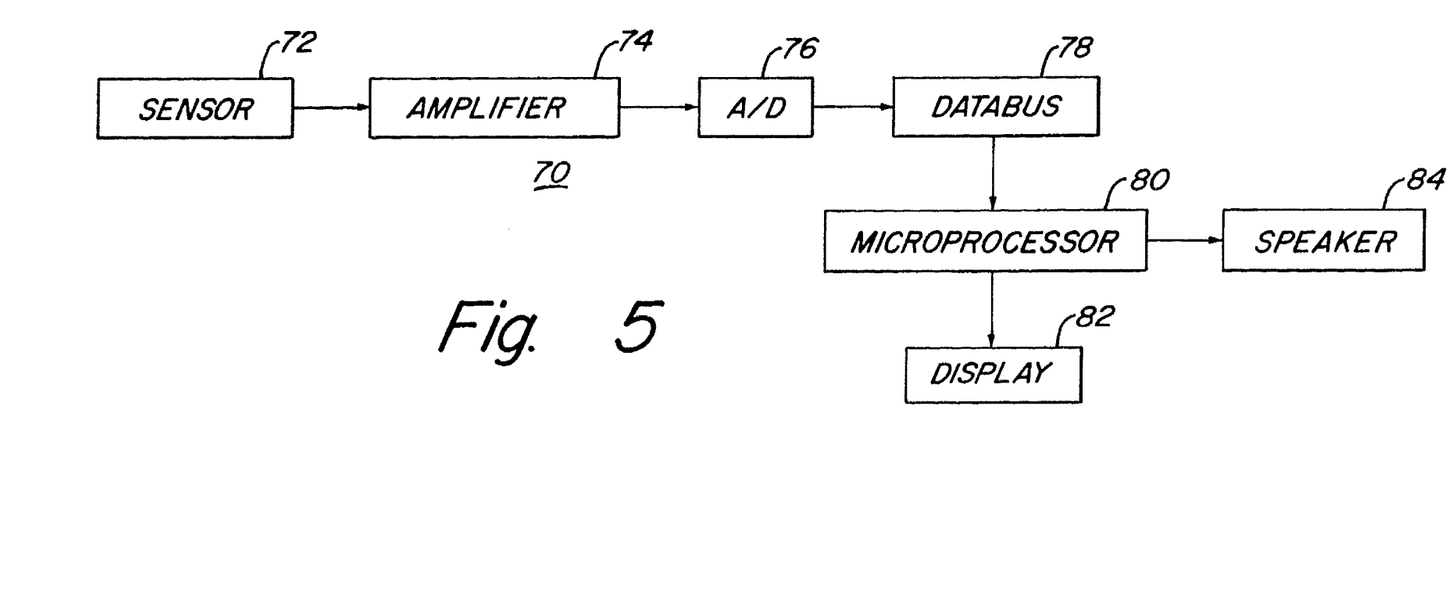
FIG. 5 is a microprocessor implementation of a turbulence indicator apparatus in accordance with a preferred embodiment of the present invention.

With reference now to FIG. 5, a microprocessor implementation of a turbulence indicator apparatus is depicted in accordance with a preferred embodiment of the present invention. Turbulence indicator apparatus 70 includes a sensor 72, which may be sensor such as sensor 52 in FIG. 3A. An amplifier 74 may be used to amplify the signal generated by sensor 72, if necessary, to some desired level for processing. A/D converter 76 transforms the signal from amplifier 74 into a digital signal that is transmitted to data bus 78. The data then is processed by microprocessor 80 and displayed on display 82 or audibly indicated by speaker 84 to the crew of an aircraft. Microprocessor 80 may be one of various types well known to those of ordinary skill in the art. For example, microprocessor 80 may be an Intel 80486 microprocessor available from Intel Corporation. Other microprocessors of varying processing power may be employed other than an Intel 80486 microprocessor. The various processes of signal conditioning, such a filtering, establishing thresholds, or averaging may be performed within microprocessor. Additionally, the adjustment for aircraft type also may be performed within microprocessor 80 with the results being displayed to an aircraft crew on display 82 or audibly indicated by speaker 84.

Figure 6:
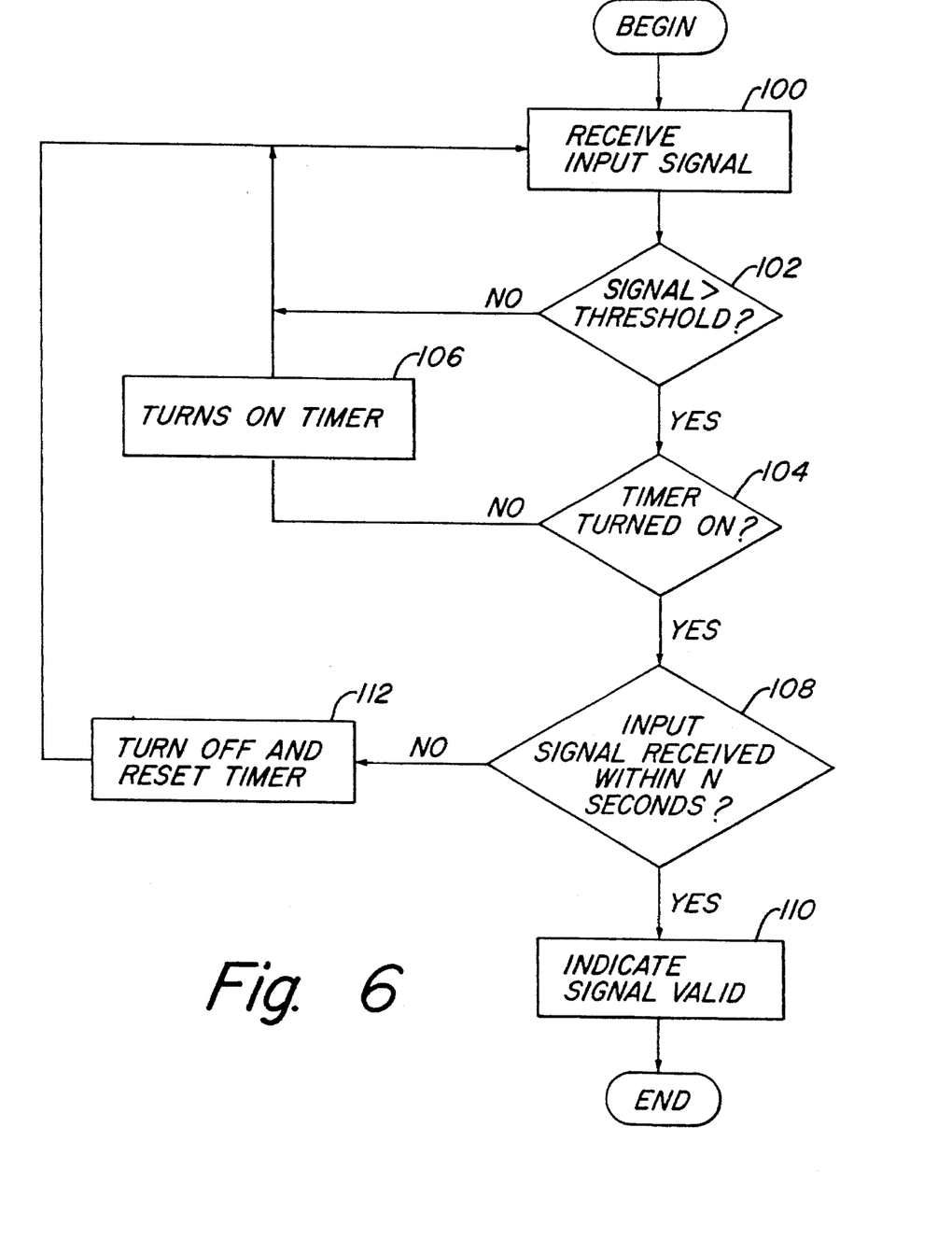
FIG. 6 is a flowchart of a process that may be implemented in the turbulence indicator apparatus of FIG. 5 in accordance with a preferred embodiment of the present invention.

Turning now to FIG. 6, a flowchart of a process that may be implemented in the turbulence indicator apparatus in FIG. 5 is illustrated in accordance with a preferred embodiment of the present invention. In particular, this process is implemented in microprocessor 80. The process begins by receiving an input signal (step 100). The input signal is generated at the sensor is received as digital signal from A/D converter 76. The process then determines whether the input signal is greater than a threshold (step 102). The selected threshold is some threshold level that eliminates noise from the input signal such that signals exceeding the threshold are actual indicators of turbulence. If the signal is not greater than the selected threshold, the process returns to step 100 to receive another input signal.

Upon receiving an input signal that is above the selected threshold, the process then determines whether the timer has been turned on (step 104). If the timer has not been turned on, the process then turns on the timer (step 106) and returns to step 100. The timer is a program or process executing on microprocessor 80 that is employed to track elapsed time. If the timer is on, a determination is made as to whether the signal has been received within n seconds (step 108). The variable "n" is selected as some amount of time to reduce indications of one time isolated vibrations. If the signal has been received within n seconds, an indication is made that the signal is valid (step 110) with the process terminating thereafter.

With reference again to step 108, if the input signal is not received within n seconds, the process then turns off and resets the timer (step 112). Thereafter the process returns to step 100.

The process in FIG. 6 basically turns a timer on when the input signal is greater than the threshold signal when a new signal is received, the process determines whether the second signal has been received within some period of time. If the second signal is received within the selected period of time, the process then sends the data on as being valid data meeting the threshold limitations along with meeting the time limitations. The process in FIG. 6 filters data based both on exceeding a threshold value and exceeding that threshold value again within some period of time.

Figure 7:
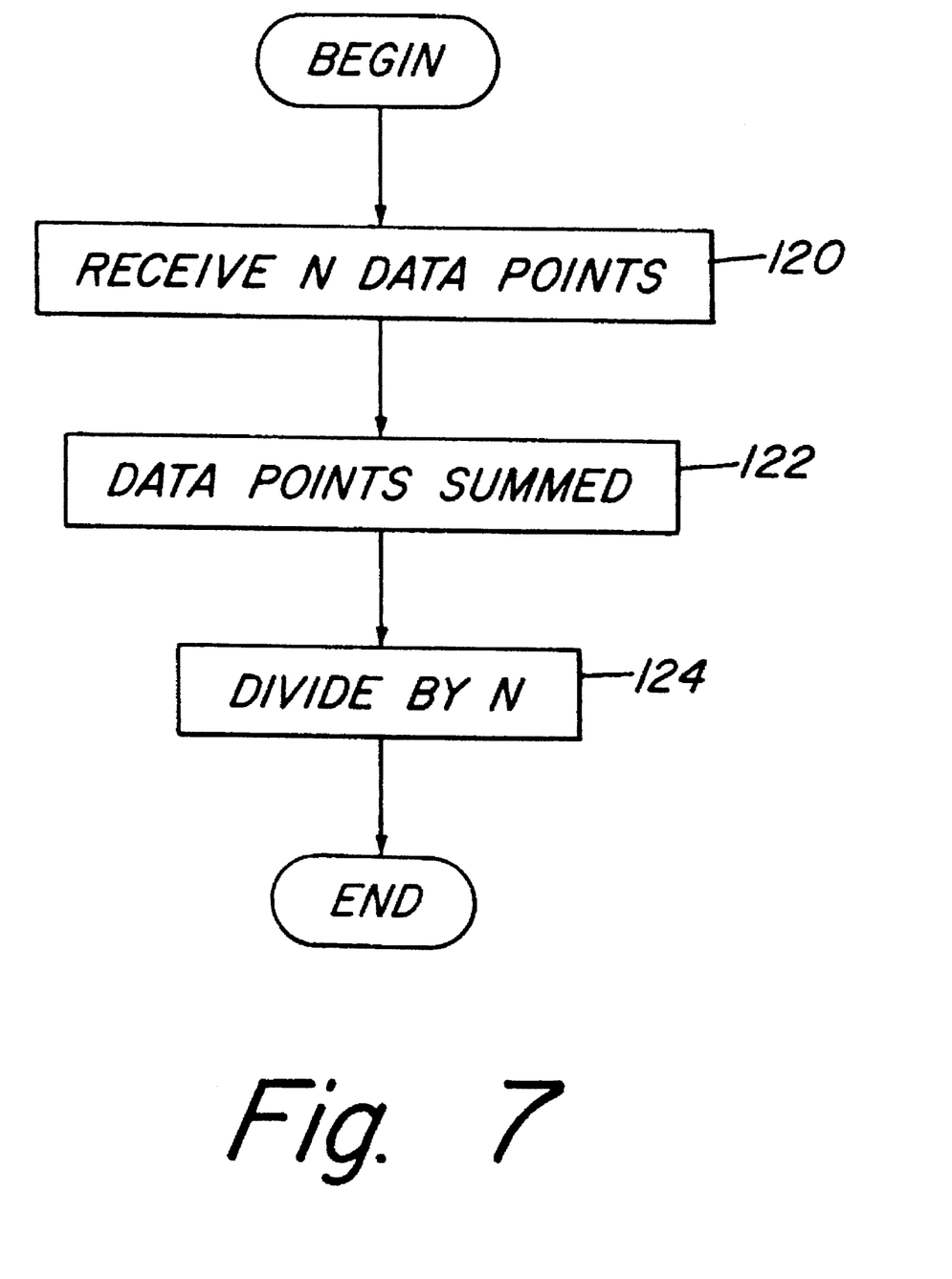
FIG. 7 is a flowchart of process for averaging data in the apparatus of FIG. 5 in accordance with a preferred embodiment of the present invention.

With reference now to FIG. 7, a process for averaging data is depicted in accordance with a preferred embodiment of the present invention. The process begins by receiving n data points (step 120). The data points are then summed (step 122) and the summed value is divided by n (step 124) with the process terminating thereafter.

Figure 8:
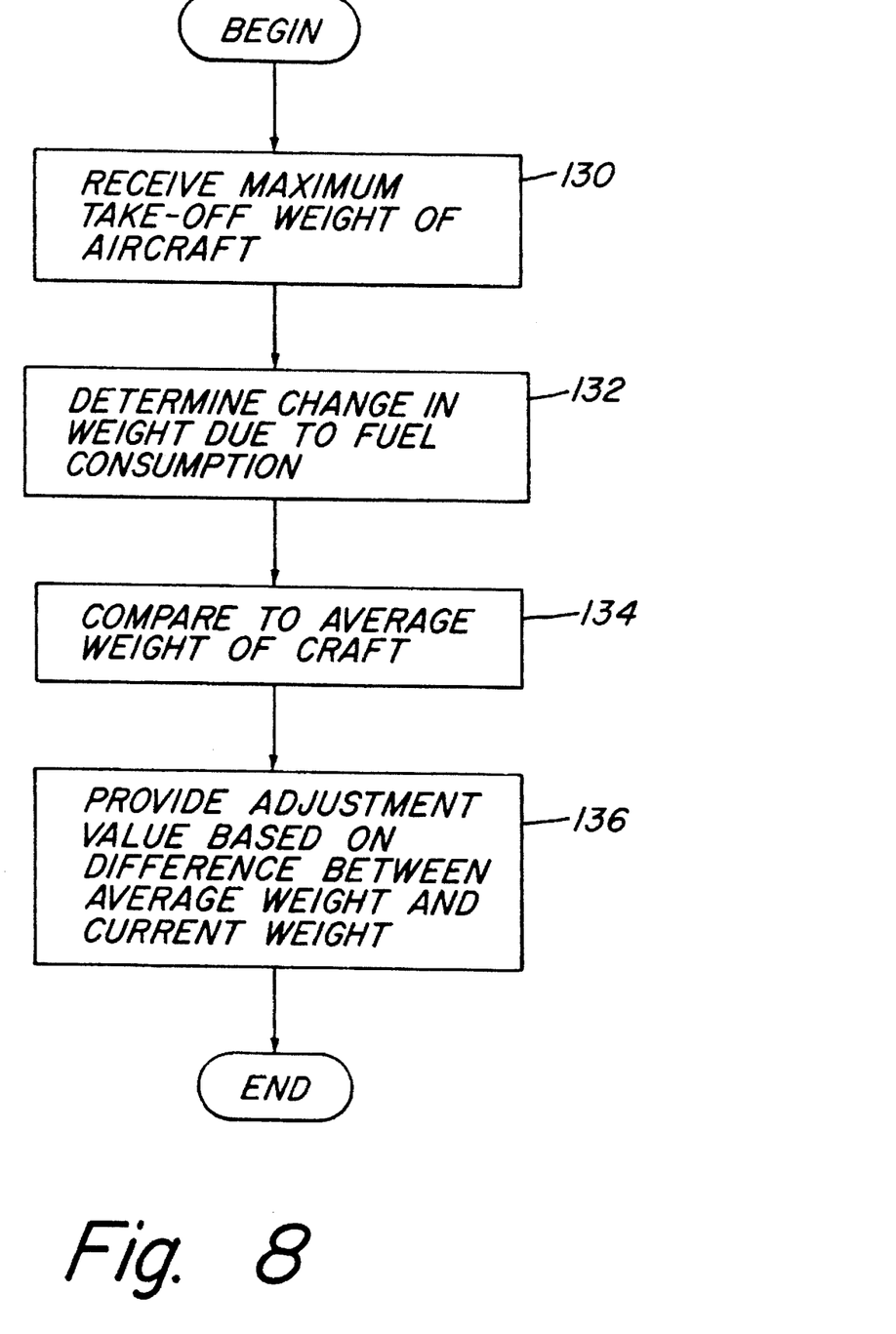
FIG. 8 is a flowchart of a process for fine tuning standardizing measurements of turbulence through accounting for changes in aircraft weight during flight.

Turning next to FIG. 8, a process for fine tuning adjustments to readings for standardizing measurements of turbulence is depicted in accordance with a preferred embodiment of the present invention. The process takes into account changes in weight of an aircraft and adjusting the turbulence indicated. The process begins by receiving the maximum take off weight of the aircraft (step 130) the process then determines the change in weight due to fuel consumption (step 132). The current weight is compared to the average weight of the aircraft (step 134). The process then provides an adjustment value based on the difference between the average weight and the current weight of the aircraft for use in standardizing a measurement of turbulence (step 136) with the process terminating thereafter. The change in weight of an aircraft may differ up to 20 percent or more of the maximum take-off weight from take-off time to landing of an aircraft. For example, if the weight during flight is 20 percent less than the average weight, the multiplier in adjustment circuit 60 would be multiplied by 0.8 to obtain the new multiplier for adjustment circuit 60. As a result, such changes in weight are taken into account by the process depicted in FIG. 8. The value provided by the process of FIG. 8 may be employed as an input into adjustment circuit 60 in FIG. 3 to help maintain a standardized indication of turbulence. In addition, this process may be implemented within the apparatus depicted in FIG. 5 by one of ordinary skill in the art.

The processes in FIGS. 6–8 may be used in conjunction with each other or with other processes for modifying the data supplied to microprocessor 80 from sensor 72.

Variations of the present invention could include blanking of the display for take-off and landing by employing pre-existing weight-on-wheels or on-the-ground sensors. This could be accomplished via the signal conditioning block 54 by establishing a fixed number of inputs above a threshold before a display is made. For example, incorporating aircraft bank angle either by the use of gyros or toroidal accelerometers would improve vertical accelerometer readings during turns of the aircraft. Additionally, recording the signal inputs may be useful in the event of passenger injury because of turbulence.

While the invention has been particularly shown and described with reference to a preferred embodiment, it will be understood by those skilled in the art that various changes in form and detail may be made therein without departing from the spirit and scope of the invention.

What is claimed is:

1. An apparatus for detecting turbulence in an aircraft comprising:
   a sensor, wherein the sensor transmits a data signal in response to detecting turbulence;
   a threshold detector circuit connected to the sensor, wherein the threshold detector receives the data signal from the sensor and transmits the data signal when the data signal exceeds a threshold value;
   an adjustment circuit connected to the threshold detector, wherein the adjustment circuit adjusts the data signal based on the characteristics of the aircraft; and
   a display device connected to the adjustment circuit, wherein the display device provides a standardized indication of aircraft turbulence.

2. The apparatus of claim 1, wherein the sensor is an accelerometer.

3. The apparatus of claim 2, wherein the accelerometer is a toroidal accelerometer.

4. The apparatus of claim 1, wherein the sensor is a vibrational sensor.

5. The apparatus of claim 1, further comprising an audible indicator for indicating a presence of aircraft turbulence, wherein different audible indications are employed to provide a standardized indication of aircraft turbulence.

6. The apparatus of claim 1, wherein the adjustment circuit adjusts the data signal based on a weight of the aircraft and the change of weight in the aircraft during flight.

7. An apparatus for detecting turbulence in an aircraft comprising:
   a sensor, wherein the sensor transmits a data signal in response to detecting turbulence;
   a microprocessor coupled to the sensor, wherein the microprocessor includes means for detecting a data signal exceeding a threshold value and a means for adjusting the data signal based on the characteristics of the aircraft in which the apparatus is located; and
   a display device coupled to the microprocessor, wherein the display device provides a standardized indication of aircraft turbulence.

8. The apparatus of claim 7, wherein the sensor is coupled to the microprocessor through an analog to digital converter, the analog to digital converter being connected to a data bus, and the data bus being connected to the microprocessor.

9. The apparatus of claim 7, wherein the sensor is an accelerometer.

10. The apparatus of claim 9, wherein the accelerometer is a toroidal accelerometer.

11. The apparatus of claim 7, wherein the sensor is a vibrational sensor.

12. The apparatus of claim 7, further comprising an audible indicator.

13. The apparatus of claim 7, wherein the means for adjusting the data signal based on the characteristics of the aircraft includes adjusting the data signal based on a change in weight of the aircraft during flight.

14. A method for detecting turbulence in an aircraft comprising:
   detecting turbulence using a sensor and transmitting a data signal in response to detecting turbulence;
   determining whether the data signal exceeds a threshold value;
   adjusting the data signal based on the characteristics of the aircraft such that the data signal is standardized in response to the data signal exceeding a threshold value; and
   displaying the adjusted data signal on a display device to provide a standardized indication of aircraft turbulence.

* * * * *